(12) United States Patent
Douskey et al.

(10) Patent No.: US 10,386,912 B2
(45) Date of Patent: Aug. 20, 2019

(54) OPERATING PULSED LATCHES ON A VARIABLE POWER SUPPLY

(71) Applicant: International Business Machines Corporation, Armonk, NY (US)

(72) Inventors: Steven M. Douskey, Rochester, MN (US); Raghu G. Gopalakrishnasetty, Bangalore (IN); Mary P. Kusko, Hopewell Junction, NY (US); Hari Krishnan Rajeev, Kollam (IN); James D. Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/404,355

(22) Filed: Jan. 12, 2017

(65) Prior Publication Data

US 2018/0196497 A1    Jul. 12, 2018

(51) Int. Cl.
*G06F 1/26* (2006.01)
*G06F 1/32* (2019.01)
*G06F 1/00* (2006.01)
*G06F 1/3287* (2019.01)
*G06F 1/3296* (2019.01)

(52) U.S. Cl.
CPC .............. *G06F 1/3287* (2013.01); *G06F 1/26* (2013.01); *G06F 1/3296* (2013.01)

(58) Field of Classification Search
CPC ..................................... G06F 1/32; G06F 1/26
See application file for complete search history.

(56) References Cited

U.S. PATENT DOCUMENTS 4,482,819 A * 11/1984 Oza ........................ G06F 1/10
                                                                327/20
4,961,013 A * 10/1990 Obermeyer, Jr. ...........................
                                                        G01R 31/318572
                                                                326/16

(Continued)

FOREIGN PATENT DOCUMENTS

WO  WO-2007/108383 A1   9/2007
WO  WO-2014/184752 A1   11/2014
WO  WO-2014/208624 A1   12/2014

OTHER PUBLICATIONS

Lin, et al., "Pulsed-Latch Utilization for Clock-Tree Power Optimization", IEEE Transactions on Very Large Scale Integration (VLSI) Systems, Apr. 2004, vol. 22, Issue 4, pp. 721-733, IEEE Xplore Digital Library (ieeexplore.ieee.org) online, DOI: 10.1109/TVLSI.2013.2252211, URL: http://ieeexplore.ieee.org/document/6494329/.

(Continued)

*Primary Examiner* — Phil K Nguyen
(74) *Attorney, Agent, or Firm* — Jason H. Sosa (57) ABSTRACT

Operating pulsed latches on a variable power supply including turning on a first power rail powering a first latch of an integrated circuit, wherein the first latch is a pulsed latch; turning on a second power rail powering a second latch of the integrated circuit, wherein the second latch is operatively coupled to the first latch; performing a scan operation using the first latch and the second latch; turning off the first power rail powering the first latch; and performing a functional operation using the second latch, wherein the first power rail powering the first latch is off during the functional operation.

18 Claims, 7 Drawing Sheets

(56) References Cited

U.S. PATENT DOCUMENTS

| | | | |
|---|---|---|---|
| 6,181,179 B1* | 1/2001 | Kanba | G01R 31/318541 327/202 |
| 6,437,623 B1* | 8/2002 | Hsu | G01R 31/319 327/202 |
| 6,665,828 B1* | 12/2003 | Arimilli | G01R 31/318385 365/201 |
| 7,768,315 B2 | 8/2010 | Cheng et al. | |
| 9,947,419 B1* | 4/2018 | Sinha | G11C 29/02 |
| 2003/0188241 A1* | 10/2003 | Zyuban | G01R 31/31721 714/726 |
| 2003/0214861 A1 | 11/2003 | Takano et al. | |
| 2006/0198181 A1 | 9/2006 | Luk et al. | |
| 2006/0242440 A1* | 10/2006 | Frederick, Jr. | G06F 1/3203 713/320 |
| 2007/0300108 A1* | 12/2007 | Saint-Laurent | G01R 31/318552 714/726 |
| 2009/0052246 A1 | 2/2009 | Bertin et al. | |
| 2009/0085609 A1 | 4/2009 | Cheng et al. | |
| 2011/0296221 A1* | 12/2011 | Gupta | G06F 1/26 713/324 |
| 2012/0072793 A1* | 3/2012 | Rao | G01R 31/318541 714/719 |
| 2013/0169360 A1* | 7/2013 | Gupta | H03K 3/0375 330/253 |
| 2013/0238916 A1 | 9/2013 | Dohm et al. | |
| 2015/0188519 A1* | 7/2015 | Singhal | H03K 19/0013 327/199 |

OTHER PUBLICATIONS

Arnica, et al., "Low-Power and Area-Efficient Shift Register Using Pulsed Latch", Imperial Journal of Interdisciplinary Research (IJIR), 2016 (month unknown), vol. 2, Issue 8, pp. 1201-1205, [accessed online Oct. 2016), Finlogy (online), URL: www.onlinejournal.in/IJIRV218/199.pdf.

* cited by examiner

OPERATING PULSED LATCHES ON A VARIABLE POWER SUPPLY

BACKGROUND

Field of the Invention

The field of the invention is data processing, or, more specifically, methods, apparatus, and products for operating pulsed latches on a variable power supply.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for operating pulsed latches on a variable power supply are disclosed in this specification. Operating pulsed latches on a variable power supply includes turning on a first power rail powering a first latch of an integrated circuit, wherein the first latch is a pulsed latch; turning on a second power rail powering a second latch of the integrated circuit, wherein the second latch is operatively coupled to the first latch; performing a scan operation using the first latch and the second latch; turning off the first power rail powering the first latch; and performing a functional operation using the second latch, wherein the first power rail powering the first latch is off during the functional operation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
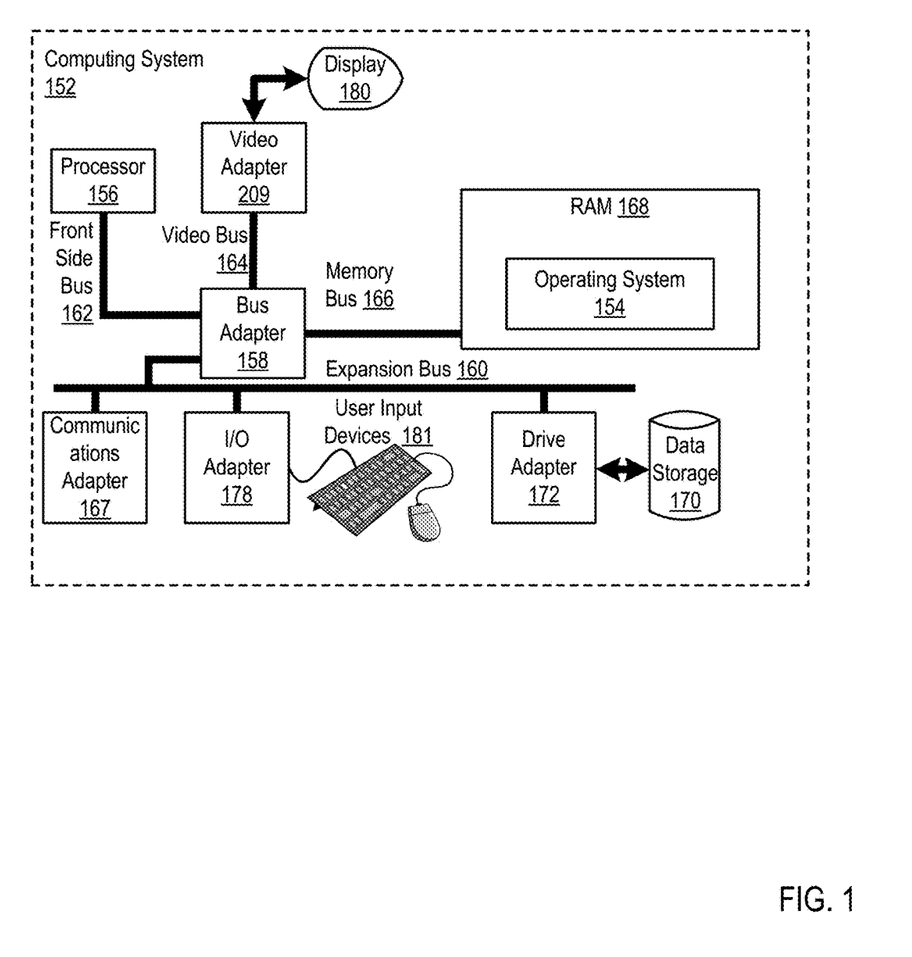
FIG. 1 sets forth a block diagram of an example system configured for operating pulsed latches on a variable power supply according to embodiments of the present invention.

Exemplary methods, apparatus, and products for operating pulsed latches on a variable power supply in accordance with the present invention are described with reference to the accompanying drawings, beginning with FIG. 1. FIG. 1 sets forth a block diagram of automated computing machinery comprising an exemplary computing system (152) configured for operating pulsed latches on a variable power supply according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for operating pulsed latches on a variable power supply according to embodiments of the present invention include UNIX™, Linux™, Microsoft XP™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for operating pulsed latches on a variable power supply according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operating pulsed latches on a variable power supply according to embodiments of the present invention include modems for wired dial-up communications, Ethernet (IEEE 802.3) adapters for wired data communications, and 802.11 adapters for wireless data communications.

Figure 2:
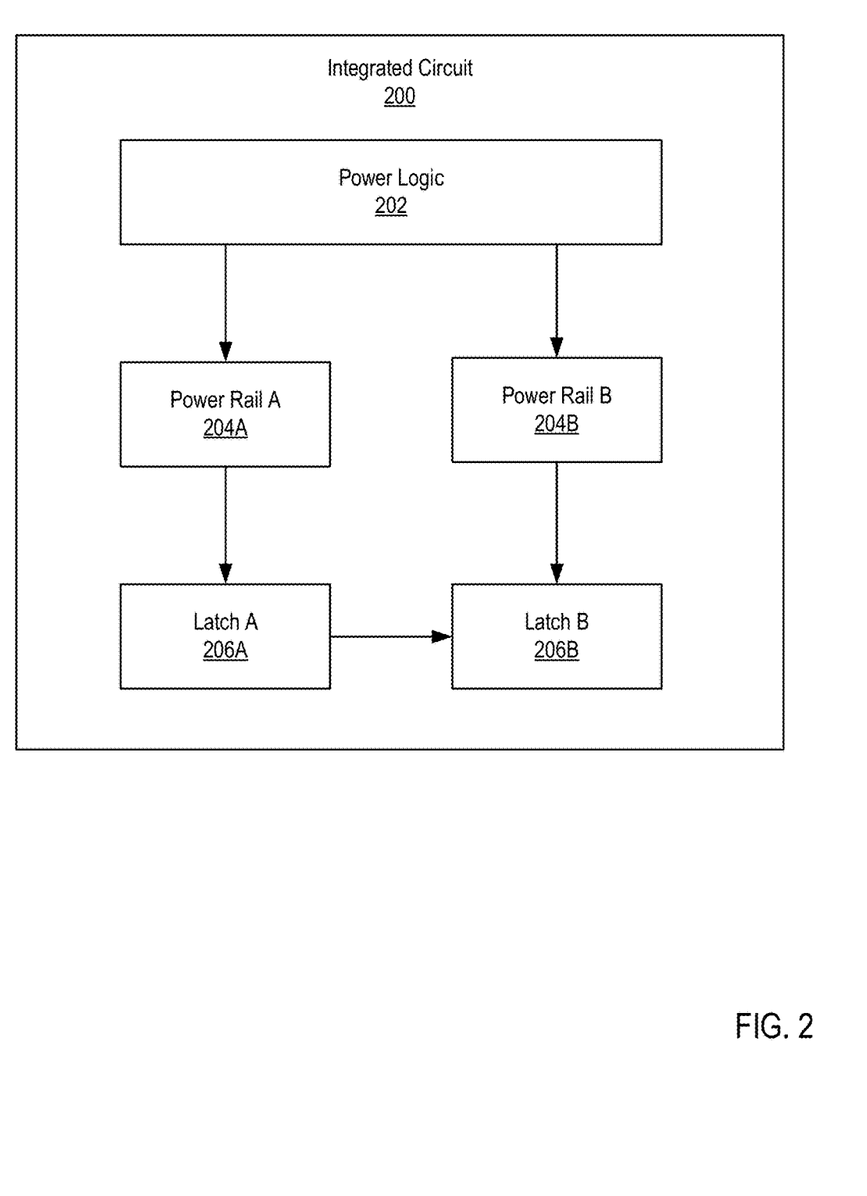
FIG. 2 sets forth an integrated circuit configured for operating pulsed latches on a variable power supply according to embodiments of the present invention.

FIG. 2 shows an integrated circuit configured for operating pulsed latches on a variable power supply in accordance with the present invention. As shown in FIG. 2, the integrated circuit (200) includes power logic (202), two power rails (power rail A (204A), power rail B (204B)), and two latches (latch A (206A), latch B (206B)).

The integrated circuit (200) is a collection of electronic components on a semiconducting material. The integrated circuit (200) may be an electronic chip, such as a computer processor or memory chip. The power logic (202) is logic that controls the power supplied to the power rails (power rail A (204A), power rail B (204B)). Power may be supplied independently to each power rail (power rail A (204A), power rail B (204B)), and the voltage on each may be varied independently. Although shown within the integrated circuit (200) in FIG. 2, the power logic (202) or a portion of the power logic (202) may reside outside of the integrated circuit (200).

The power logic (202) may generate a scan mode signal that enables power to the power rail that powers the scan-only latches (latches only used during the scan operation) during the scan operation, and disables the power rail during functional operation. Additionally, or alternatively, the power logic (202) may incorporate different scan modes, and other control signals may gate the power in different modes.

The power rails (power rail A (204A), power rail B (204B)) are a collection of wires and lines that connect a power supply to electronic components, such as the latches (latch A (206A), latch B (206B)). Each power rail (power rail A (204A), power rail B (204B)) shown in FIG. 2 may be representative of a number of power rails that may be controlled in groups or individually.

The latches (latch A (206A), latch B (206B)) are circuits that store information, such as a bit. The integrated circuit (200) may include millions of latches. The latches (latch A (206A), latch B (206B)) may be scan-able pulsed latches utilized in a scan operation. A scan operation is an operation that places (i.e., scans in) information, such as bits, in a set of latches. The scan operation may be performed to reset all values stored in the latches (e.g., to zero out all stored values). The scan operation may be part of a system test, in which case the information may be read (i.e., scanned out) as part of the scan operation.

Although both latches (latch A (206A), latch B (206B)) may be utilized during a scan operation, one set of latches (e.g., latch A (206A)) may not be used during a functional operation. A functional operation is an operation utilizing the storage capabilities of the latches as volatile computer memory, and does not incorporate the latches used only in the scan operation (i.e., scan-only latches). As shown in FIG. 2, the latch (latch A (206A)) only utilized during the scan operation is placed on a separate power rail (power rail A (204A)) from the latch (latch B (206B)) used during both the scan operation and the functional operation.

Although not shown in FIG. 2, circuitry within one or more of the latches may be incorporated to prevent adverse effects from operating one latch (e.g., latch B (206B)) while an adjacent latch (e.g., latch A (206A)) is powered off during functional operation. Such circuitry may, for example, prevent a backwards current draw from the powered latch. For example, an internal transmission gate may act as a barrier between a powered latch and a non-powered latch.

Figure 3:
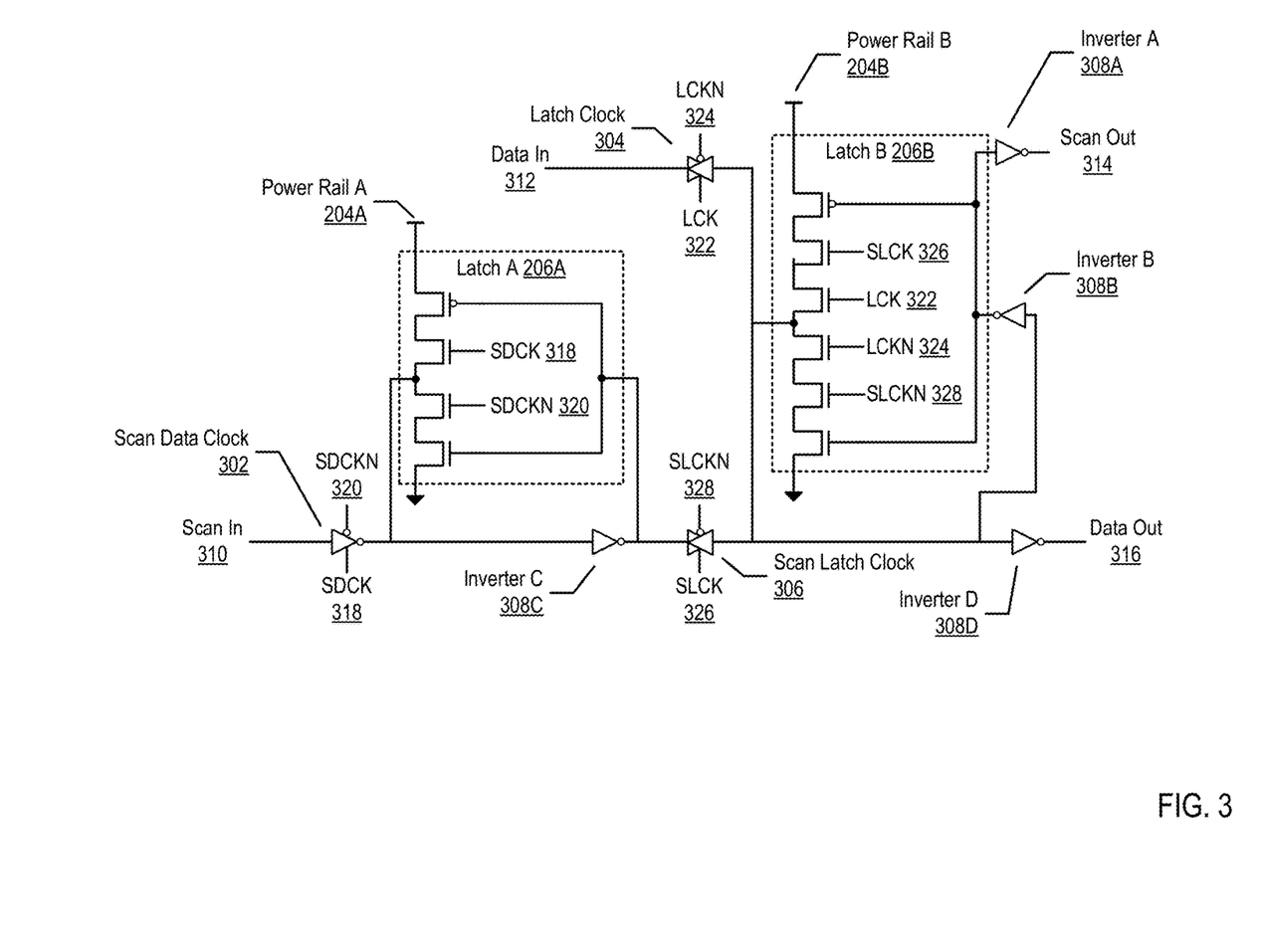
FIG. 3 sets forth an example schematic diagram for operating pulsed latches on a variable power supply according to embodiments of the present invention.

FIG. 3 shows an example schematic diagram for operating pulsed latches on a variable power supply in accordance with the present invention. As shown in FIG. 3, the example schematic includes two latches (latch A (206A), latch B (206B)), each powered by separate power rails (power rail A (204A), power rail B (204B)). The schematic diagram also includes inverters (inverter A (308A), inverter B (308B), inverter C (308C), inverter D (308D)), and four in/out lines (scan in (310), data in (312), scan out (314), data out (316)).

Each latch (latch A (206A), latch B (206B)) includes a set of transistors connected to clocks (scan data clock (302), latch clock (304), scan latch clock (306)). Each clock (scan data clock (302), latch clock (304), scan latch clock (306)) includes two outputs. The scan data clock (302) includes outputs SDCKN (320) and SDCK (318). The latch clock (304) includes outputs LCKN (324) and LCK (322). The scan latch clock (306) includes outputs SLCKN (328) and SLCK (326).

Other components of the diagram of FIG. 3 may also be powered down along with power rail A (204A) during the functional operation. For example, because the scan in (310) line is not used during the functional operation, the drivers for the scan data clock (302) input and inverter C (308C) may be placed on the same power rail and powered down along with latch A (206A). Also, for example, because the scan out (314) line is not used during the functional operation, inverter A (308A) may also be powered down along with latch A (206A).

Figure 4:
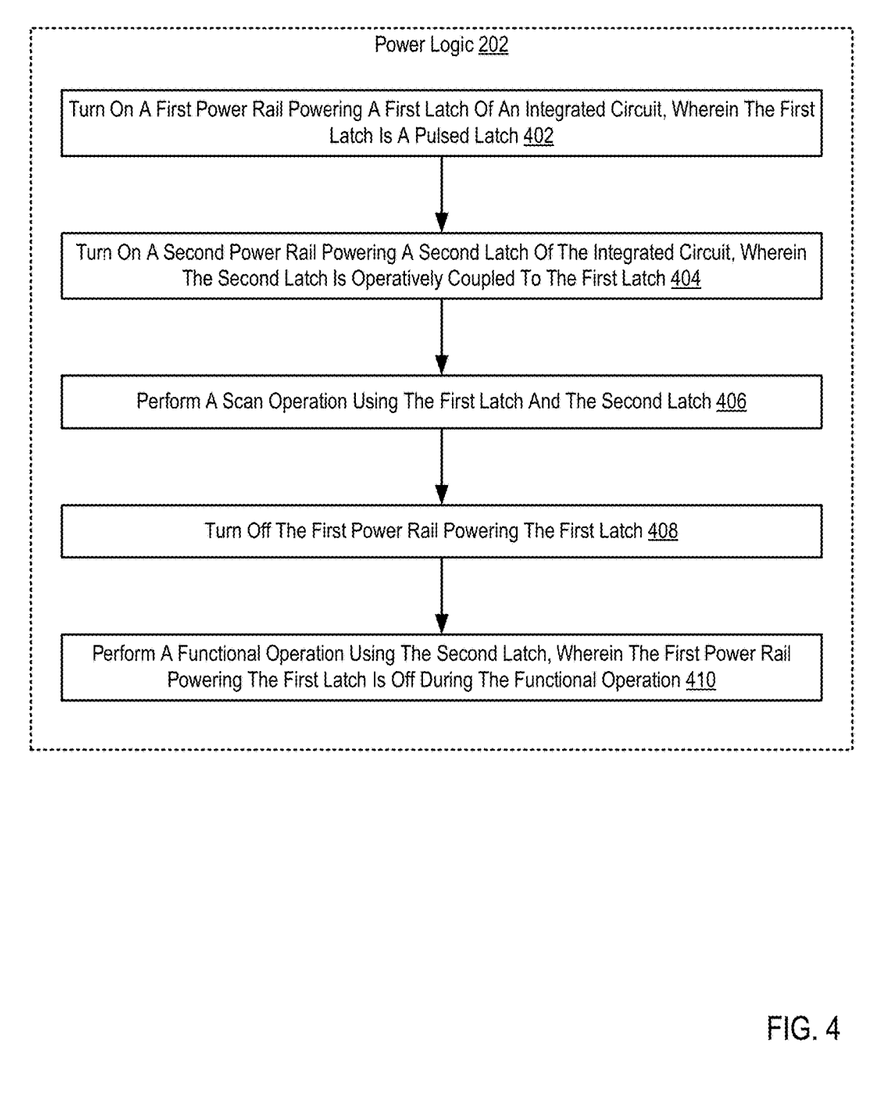
FIG. 4 sets forth a flow chart illustrating an exemplary method for operating pulsed latches on a variable power supply according to embodiments of the present invention.

For further explanation, FIG. 4 sets forth a flow chart illustrating an exemplary method for operating pulsed latches on a variable power supply according to embodiments of the present invention. The method of FIG. 4 includes turning (402) on a first power rail powering a first latch of an integrated circuit, wherein the first latch is a pulsed latch. Turning (402) on a first power rail powering a first latch of an integrated circuit, wherein the first latch is a pulsed latch may be carried out by activating a switch attached to the first power rail that applies voltage to the first power rail. The first power rail may be attached to a plurality of latches utilized in a scan operation.

The switch used to apply or remove power from the first power rail may be a head switch (located at the source of the power rail) or a foot switch (located at the drain of the power rail). The switch may be a bulk switch at the root of the power source, or may be distributed across the architecture. The power supply for the first power rail may be supplied as a separate chip global rail, without individual head or foot switches within the integrated circuit. The power supply may include an external switch.

The method of FIG. 4 also includes turning (404) on a second power rail powering a second latch of the integrated circuit, wherein the second latch is operatively coupled to the first latch. Turning (404) on a second power rail powering a second latch of the integrated circuit, wherein the second latch is operatively coupled to the first latch may be carried out by activating a switch attached to the second power rail that applies voltage to the second power rail. The second power rail may be attached to a plurality of latches utilized in both a scan operation and functional operation.

The method of FIG. 4 also includes performing (406) a scan operation using the first latch and the second latch. Performing (406) a scan operation using the first latch and the second latch may be carried out by loading values (e.g., a bit) into the first latch and the second latch. The values may be ground or '0' values in order to zero out the contents of each latch. The scan operation may further include reading the values (i.e., scanning out) from each latch. The scan operation also may include moving the value from one latch to another latch, such as from the first latch to the second latch.

The method of FIG. 4 also includes turning (408) off the first power rail powering the first latch. Turning (408) off the first power rail powering the first latch may be carried out by deactivating a switch or group of switches attached to the first power rail that applies voltage to the first power rail, removing the voltage from the first power rail. The switch or switches may be on the integrated circuit (localized or distributed), or external to the integrated circuit, or a combination of both.

The method of FIG. 4 also includes performing (410) a functional operation using the second latch, wherein the first power rail powering the first latch is off during the functional operation. Performing (410) a functional operation using the second latch, wherein the first power rail powering the first latch is off during the functional operation may be carried out by utilizing the second latch as part of a group of latches to perform a storage function on the integrated circuit, such as volatile computer or chip memory. Performing (410) a functional operation using the second latch, and without utilizing the first latch, may include utilizing the second latch in a manner requiring that the second latch have access to power, and utilizing the first latch in a manner that does not require that the first latch have access to power.

For example, the integrated circuit may be part of a computing system within an automobile. When the automobile is initially turned on, the integrated circuit may clear the contents of a group of pulsed latches on the integrated circuit using a scan operation. The power logic may turn on a first power rail that powers each scan-only latch (laches only used during the scan operation) and turn on a second power rail that powers another set of latches used for both scan operations and functional operations. The power logic may then perform the scan operation using the latches powered by the first power rail and the latches powered by the second power rail. Once the scan operation is complete, the power logic may turn off the first power rail powering the scan-only latches, and begin functional operation of the latches powered by the second power rail. The functional operation may include storing data about the engine performance while the automobile is in motion.

Figure 5:
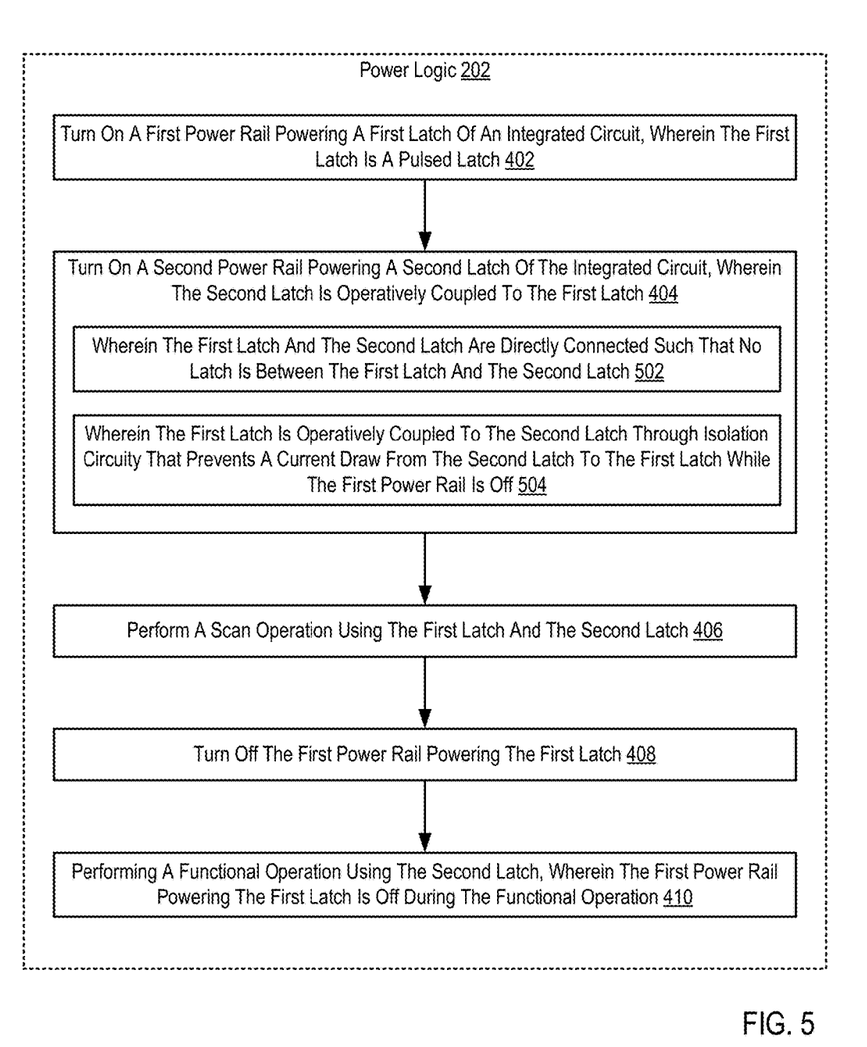
FIG. 5 sets forth a flow chart illustrating an exemplary method for operating pulsed latches on a variable power supply according to embodiments of the present invention.

For further explanation, FIG. 5 sets forth a flow chart illustrating a further exemplary method for operating pulsed latches on a variable power supply according to embodiments of the present invention that includes turning (402) on a first power rail powering a first latch of an integrated circuit, wherein the first latch is a pulsed latch; turning (404) on a second power rail powering a second latch of the integrated circuit, wherein the second latch is operatively coupled to the first latch; performing (406) a scan operation using the first latch and the second latch; turning (408) off the first power rail powering the first latch; and performing (410) a functional operation using the second latch, wherein the first power rail powering the first latch is off during the functional operation.

The method of FIG. 5 differs from the method of FIG. 4, however, in that turning (404) on a second power rail powering a second latch of the integrated circuit, wherein the second latch is operatively coupled to the first latch includes wherein (502) the first latch and the second latch are directly connected such that no latch is between the first latch and the second latch; and wherein (504) the first latch is operatively coupled to the second latch through isolation circuitry that prevents a current draw from the second latch to the first latch while the first power rail is off.

The first latch and the second latch being directly connected such that no latch is between the first latch and the second latch may be carried out by operatively connecting a scan or data wire from the first latch to the second latch. The first latch and the second latch may be consecutively coupled to one another in that outputs from the first latch are connected to inputs for the second latch. The first latch being operatively coupled to the second latch through isolation circuitry that prevents a current draw from the second latch to the first latch while the first power rail is off may be carried out by placing, between the latches, circuitry configured to block or counteract current draw from the powered-on latch to the powered-off latch.

Figure 6:
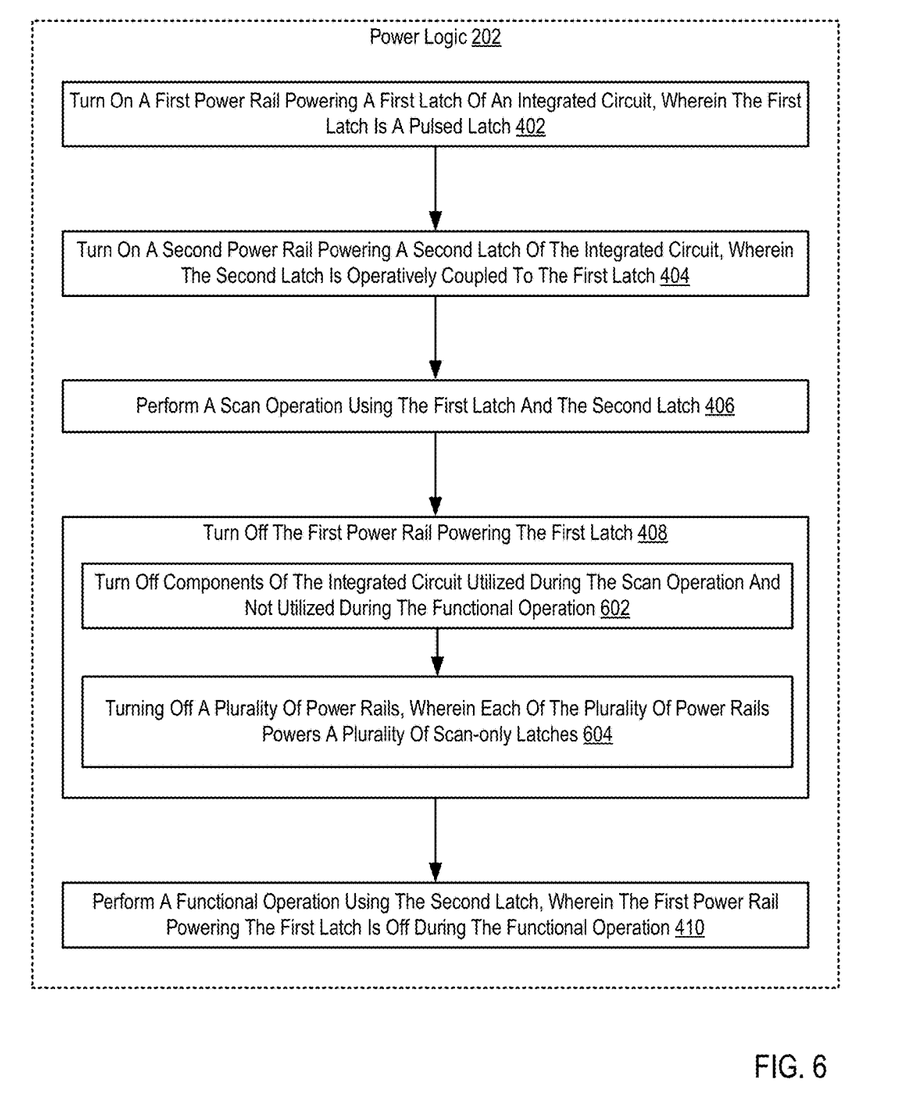
FIG. 6 sets forth a flow chart illustrating an exemplary method for operating pulsed latches on a variable power supply according to embodiments of the present invention.

For further explanation, FIG. 6 sets forth a flow chart illustrating a further exemplary method for operating pulsed latches on a variable power supply according to embodiments of the present invention that includes turning (402) on a first power rail powering a first latch of an integrated circuit, wherein the first latch is a pulsed latch; turning (404) on a second power rail powering a second latch of the integrated circuit, wherein the second latch is operatively coupled to the first latch; performing (406) a scan operation using the first latch and the second latch; turning (408) off the first power rail powering the first latch; and performing (410) a functional operation using the second latch, wherein the first power rail powering the first latch is off during the functional operation.

The method of FIG. 6 differs from the method of FIG. 4, however, in that turning (408) off the first power rail powering the first latch includes turning (602) off components of the integrated circuit utilized during the scan operation and not utilized during the functional operation; and turning (604) off a plurality of power rails, wherein each of the plurality of power rails powers a plurality of scan-only latches.

Turning (602) off components of the integrated circuit utilized during the scan operation and not utilized during the functional operation may be carried out by turning off a switch on a power rail that powers components, other than latches, that are only used during the scan operation. For example, an integrated circuit may have circuitry used to scan in, scan out, place, or read values into the latches that is unused during the functional operation of the latches. Power to some or all of that circuitry may be removed during the functional operation of the latches.

Turning (604) off a plurality of power rails, wherein each of the plurality of power rails powers a plurality of scan-only latches may be carried out by deactivating a switch or group of switches attached to the plurality of power rails that applies voltage to the plurality of power rails, removing the voltage from each of the plurality of power rails. The switch or switches may be on the integrated circuit (localized or distributed), or external to the integrated circuit, or a combination of both.

Figure 7:
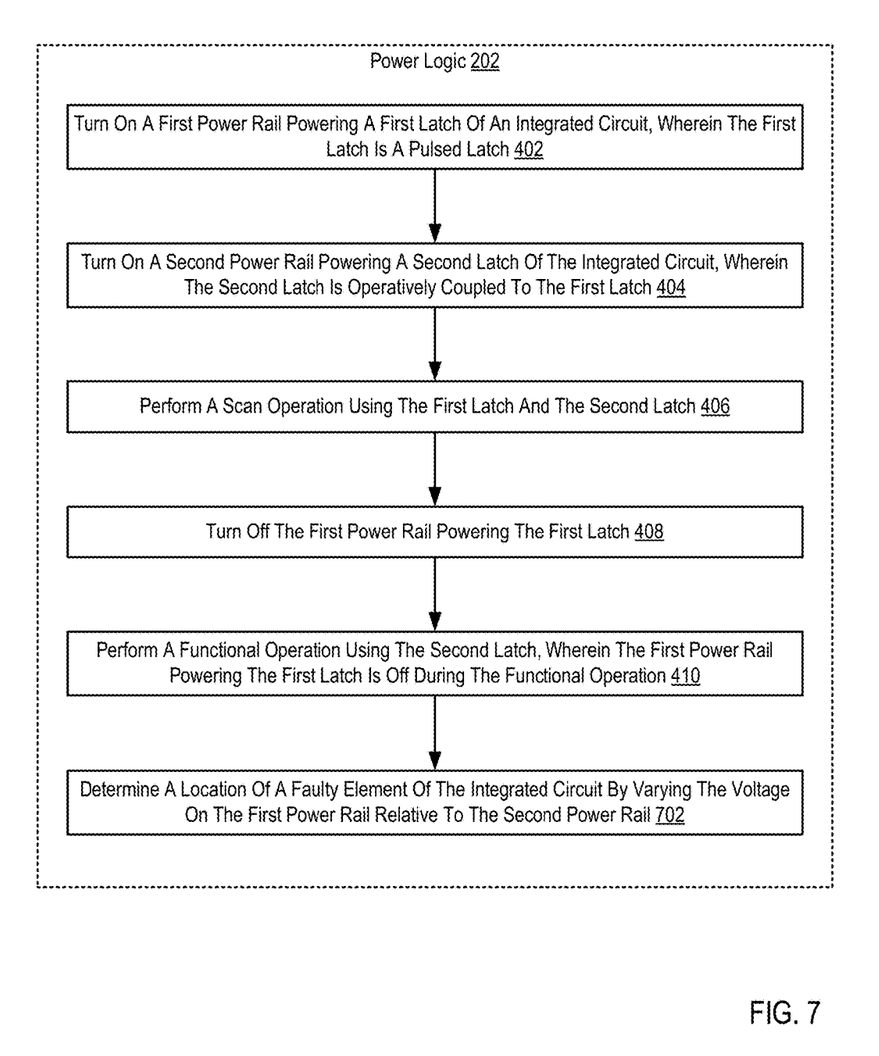
FIG. 7 sets forth a flow chart illustrating an exemplary method for operating pulsed latches on a variable power supply according to embodiments of the present invention.

For further explanation, FIG. 7 sets forth a flow chart illustrating a further exemplary method for operating pulsed latches on a variable power supply according to embodiments of the present invention that includes turning (402) on a first power rail powering a first latch of an integrated circuit, wherein the first latch is a pulsed latch; turning (404) on a second power rail powering a second latch of the integrated circuit, wherein the second latch is operatively coupled to the first latch; performing (406) a scan operation using the first latch and the second latch; turning (408) off the first power rail powering the first latch; and performing (410) a functional operation using the second latch, wherein the first power rail powering the first latch is off during the functional operation.

The method of FIG. 7 differs from the method of FIG. 4, however, in that the method further includes determining (702) a location of a faulty element of the integrated circuit by varying the voltage on the first power rail relative to the second power rail. Determining (702) a location of a faulty element of the integrated circuit by varying the voltage on the first power rail relative to the second power rail may be carried out by altering the voltage applied to the first power rail for the purpose of reading or scanning-out the result to determine if a latch or other component on the integrated circuit fails to produce an expected result.

In view of the explanations set forth above, readers will recognize that the benefits of operating pulsed latches on a variable power supply according to embodiments of the present invention include:

- Improving the operation of integrated circuits by placing scan-only latches on a separate power rail from latches used during functional operation, reducing the power consumption of the integrated circuit during functional operation.
- Improving the operation of integrated circuits by providing a mechanism to remove voltage from a portion of the latches on the integrated circuit, increasing the efficiency of integrated circuit manufacturing.

Exemplary embodiments of the present invention are described largely in the context of a fully functional computer system for operating pulsed latches on a variable power supply. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating pulsed latches on a variable power supply, the method comprising:

turning on a first power rail powering a first latch of an integrated circuit, wherein the first latch is a pulsed latch;

turning on a second power rail powering a second latch of the integrated circuit, wherein the second latch is operatively coupled to the first latch;

performing a scan operation using the first latch and the second latch;

turning off the first power rail powering the first latch;

performing a functional operation using the second latch, wherein the first power rail powering the first latch is off during the functional operation; and determining a location of a faulty element of the integrated circuit by varying the voltage on the first power rail relative to the second power rail.

2. The method of claim 1, the first latch is one of a plurality of latches powered by the first power rail, and wherein the second latch is one of a plurality of latches powered by the second power rail.

3. The method of claim 1, wherein the first latch and the second latch are directly connected such that no latch is between the first latch and the second latch.

4. The method of claim 1, wherein turning off the first power rail powering the first latch comprises turning off components of the integrated circuit utilized during the scan operation and not utilized during the functional operation.

5. The method of claim 1, wherein the first latch is operatively coupled to the second latch through isolation circuitry that prevents a current draw from the second latch to the first latch while the first power rail is off.

6. The method of claim 1, wherein turning off the first power rail powering the first latch comprises turning off a plurality of power rails, wherein each of the plurality of power rails powers a plurality of scan-only latches.

7. An apparatus for operating pulsed latches on a variable power supply, the apparatus comprising computer memory having disposed within it computer program instructions that, when executed, cause the apparatus to carry out the steps of:

turning on a first power rail powering a first latch of an integrated circuit, wherein the first latch is a pulsed latch;

turning on a second power rail powering a second latch of the integrated circuit, wherein the second latch is operatively coupled to the first latch;

performing a scan operation using the first latch and the second latch;

turning off the first power rail powering the first latch;

performing a functional operation using the second latch, wherein the first power rail powering the first latch is off during the functional operation; and determining a location of a faulty element of the integrated circuit by varying the voltage on the first power rail relative to the second power rail.

8. The apparatus of claim 7, the first latch is one of a plurality of latches powered by the first power rail, and wherein the second latch is one of a plurality of latches powered by the second power rail.

9. The apparatus of claim 7, wherein the first latch and the second latch are directly connected such that no latch is between the first latch and the second latch.

10. The apparatus of claim 7, wherein turning off the first power rail powering the first latch comprises turning off components of the integrated circuit utilized during the scan operation and not utilized during the functional operation.

11. The apparatus of claim 7, wherein the first latch is operatively coupled to the second latch through isolation circuitry that prevents a current draw from the second latch to the first latch while the first power rail is off.

12. The apparatus of claim 7, wherein turning off the first power rail powering the first latch comprises turning off a plurality of power rails, wherein each of the plurality of power rails powers a plurality of scan-only latches.

13. A computer program product for operating pulsed latches on a variable power supply, the computer program product disposed upon a computer readable medium, the computer program product comprising computer program instructions that, when executed, cause a computer to carry out the steps of:
   turning on a first power rail powering a first latch of an integrated circuit, wherein the first latch is a pulsed latch;
   turning on a second power rail powering a second latch of the integrated circuit, wherein the second latch is operatively coupled to the first latch;
   performing a scan operation using the first latch and the second latch;
   turning off the first power rail powering the first latch;
   performing a functional operation using the second latch, wherein the first power rail powering the first latch is off during the functional operation; and
   determining a location of a faulty element of the integrated circuit by varying the voltage on the first power rail relative to the second power rail.

14. The computer program product of claim 13, the first latch is one of a plurality of latches powered by the first power rail, and wherein the second latch is one of a plurality of latches powered by the second power rail.

15. The computer program product of claim 13, wherein the first latch and the second latch are directly connected such that no latch is between the first latch and the second latch.

16. The computer program product of claim 13, wherein turning off the first power rail powering the first latch comprises turning off components of the integrated circuit utilized during the scan operation and not utilized during the functional operation.

17. The computer program product of claim 13, wherein the first latch is operatively coupled to the second latch through isolation circuitry that prevents a current draw from the second latch to the first latch while the first power rail is off.

18. The computer program product of claim 13, wherein turning off the first power rail powering the first latch comprises turning off a plurality of power rails, wherein each of the plurality of power rails powers a plurality of scan-only latches.

* * * * *